3,198,713
STACKED PETRI DISHES
James B. McCormick, La Grange, Ill., assignor, by mesne assignments, to Ames Atomium, Inc., Billerica, Mass., a corporation of Massachusetts
Filed July 6, 1962, Ser. No. 207,896
1 Claim. (Cl. 195—139)

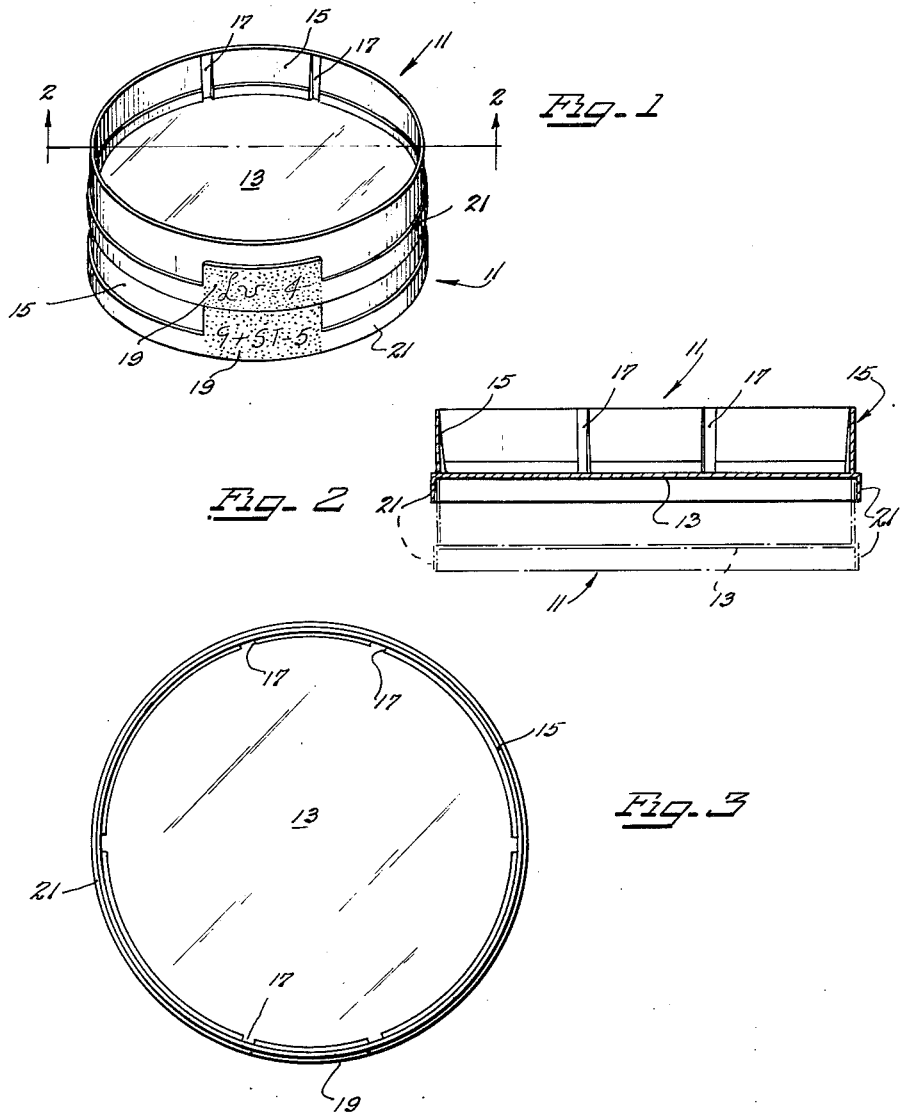

This invention relates to petri dishes such as are used to incubate cultures, and has for its principal object the provision of an improved petri dish which is particularly adapted to be arranged with one or more similar dishes to form a relatively stable stack, in which arrangement each dish serves as the lid for an underlying dish.

Another object of the invention is to provide a petri dish which is seatable upon a similar underlying dish in a stack, but which is also particularly adapted to rest in a stable position upon a flat supporting surface.

Other objects and advantages of the invention will become apparent with reference to the following description and the accompanying drawing.

In the drawing:

FIGURE 1 is a perspective view of a pair of the petri dishes hereinafter described, as the dishes appear when stacked one upon the other;

FIGURE 2 is an enlarged sectional elevational view of the uppermost dish of the stack shown in FIG. 1, with the lowermost dish of the stack being shown by broken lines to illustrate the interengagement of the dishes when stacked; and FIGURE 3 is an enlarged plan view of the stack of containers shown in FIG. 1.

The petri dish 11 illustrated in the drawing constitutes one embodiment of the present invention and is preferably formed of a transparent plastic so that, when arranged with other dishes in stacked formation, its contents may be easily observed by the laboratory technician. Each dish comprises a flat horizontally disposed plate 13 which supports the contents of the dish on its upper surface. The dish 11 and, hence, the plate 13 are preferably circular in shape so that the dish will seat upon an underlying dish regardless of its rotative orientation relative thereto, and so that any dish of the stack may be rotated relative to the stack to provide different angles of observation.

Extending upwardly from the base plate 13 adjacent the periphery thereof is a generally cylindrical retaining wall 15 which, together with the plate 13, defines the receiving cavity of the dish. The wall 14 is of a gradually tapering cross-section, being relatively wide at its lower edge adjacent the base plate 13, and tapering to a blunt upper edge which lies in a plane generally parallel to the plate 13. Circumferentially spaced vertically disposed grooves 17 extend inwardly from the inner surface of the wall and divide the wall into a series of spaced segments. The tapered configuration of the wall 13 provides it with greater strength and rigidity, thus enabling a dish of minimum weight to support a number of overlying dishes of a stack.

In order that the dish may be easily labeled so as to identify its contents, the side wall 15 is formed to include an outwardly projecting portion or plaque 19 which extends a short distance across a portion of the outer surface of the wall and is of a height somewhat less than the wall itself. The outer surface of the plaque is treated so as to provide it with a translucent roughened surface on which pencil or crayon marks can easily be made.

Depending from the base plate 13 is a flange 21 which, like the wall 15, is generally cylindrical but is of somewhat lesser height than the wall 15. The flange 21 is offset outwardly from the plane of the wall 15 so as to enable it to encircle the upper edge portion of an underlying dish when seated thereon to prevent lateral movement of the stacked dishes relative to one another. The lower edge of the flange lies in a plane generally parallel to the plane of the plate 13 and, consequently, in a plane parallel to the plane of the upper edge of the wall 15. The plate 13 of the overlying dish will therefore be supported in a level position when the lowermost dish of the stack is so supported.

The flange 21, in addition to encircling the upper edge portion of a wall 15 of an underlying container, also provides a circular supporting edge for the dish and thus enhances its stability, as when it is the bottom dish of a stack. Also, the flange 21 elevates the plate 13 above the surface upon which the dish is supported, thus eliminating the possibility that the lower area of the plate will be contaminated by the supporting surface. This feature is important since, when the dishes are stacked, the plate 13 overlies the cavity of the underlying dish and, if contaminated, might contaminate the contents of the lower dish. In the embodiment shown, only the lower edge of the flange can become contaminated, and this edge always is disposed on the outside of an underlying dish of the stack and not in overlying relation to the contents thereof.

When the dishes are arranged in stacked formation, the overlying dish is disposed with its plate 13 resting upon the upper edge of the wall 15 of the underlying container. The overlying dish thereby serves not only as a receptacle, but also as a lid for the underlying dish, thus eliminating the need for a separate lid for each dish and providing a substantial savings in cost as well as in the number of units which must be stocked, stored, handled and cleaned.

Furthermore, when the containers are stacked, the flange 21 encircles the upper portion of the wall 15 and prevents relative movement between the dishes, thereby rendering the stack stable under ordinary circumstances.

An improved petri dish has thus been provided which is particularly adapted to be arranged in a stable, stacked formation with similar dishes, in which arrangement it provides a lid for an underlying dish. Also, the structure of the dish is such that it is particularly stable when resting directly upon a supporting surface and, when so supported, will not become contaminated to an extent which would render it unusable as a lid for an underlying dish.

While one specific embodiment of the invention showing various features of the invention has been shown and described, it should be apparent that various modifications may be made therein without departing from the scope of the invention as set forth in the following claim.

What is claimed is:

A plurality of open-topped petri dishes arranged to form a stable stack which includes a base dish and a plurality of overlying dishes supported by said base dish one upon the other, each overlying dish serving as a lid for an underlying dish, said base dish and said overlying dishes being identical to one another and being interchangeable so as to occupy any position in the stack, each of said dishes comprising an imperforate horizontally disposed circular plate adapted to support the contents of the dish on its upper surface, said plate being adapted to overlie the receiving cavity of an underlying dish when the dish of said plate occupies the position of an overlying dish and being adapted to overlie a surface supporting the stack when said dish occupies the position of a base dish, means defining a wall extending upwardly from said plate adjacent the periphery thereof, said wall and plate thereby defining the receiving cavity of said dish, and a flange depending downwardly from said plate adjacent the periphery thereof, said flange defining a vertically disposed inwardly facing generally cylindrical surface offset outwardly slightly relative to the outer surface of the upper edge of the upwardly extending wall so as to permit the flange of the overlying dishes to be interfiitted with the upper edge portion of the upwardly extending wall of an underlying dish, thereby enabling the dishes to form a stable stack, said flange of a dish being located outside and enclosing the receiving cavity of an underlying dish, and elevating the plate of the base dish above the surface supporting the stack.

References Cited by the Examiner
UNITED STATES PATENTS

| | | |
|---|---|---|
| 815,883 | 3/06 | Blarcom. |
| 2,348,448 | 5/44 | Brewer. |
| 2,361,992 | 11/44 | Cantor. |
| 2,631,747 | 3/53 | Stolte. |
| 3,001,914 | 9/61 | Anderson. |
| 3,097,070 | 7/63 | Aldrich et al. |

OTHER REFERENCES

Aloe Scientific Equipment Catalogue, No. 103, received in U.S. Patent Office March 3, 1953, page 444.

A. LOUIS MONACELL, *Primary Examiner.*